Jan. 22, 1952  R. B. HOUPLAIN  2,583,428
IRREVERSIBLE DRIVING DEVICE
Filed June 4, 1946  2 SHEETS—SHEET 2
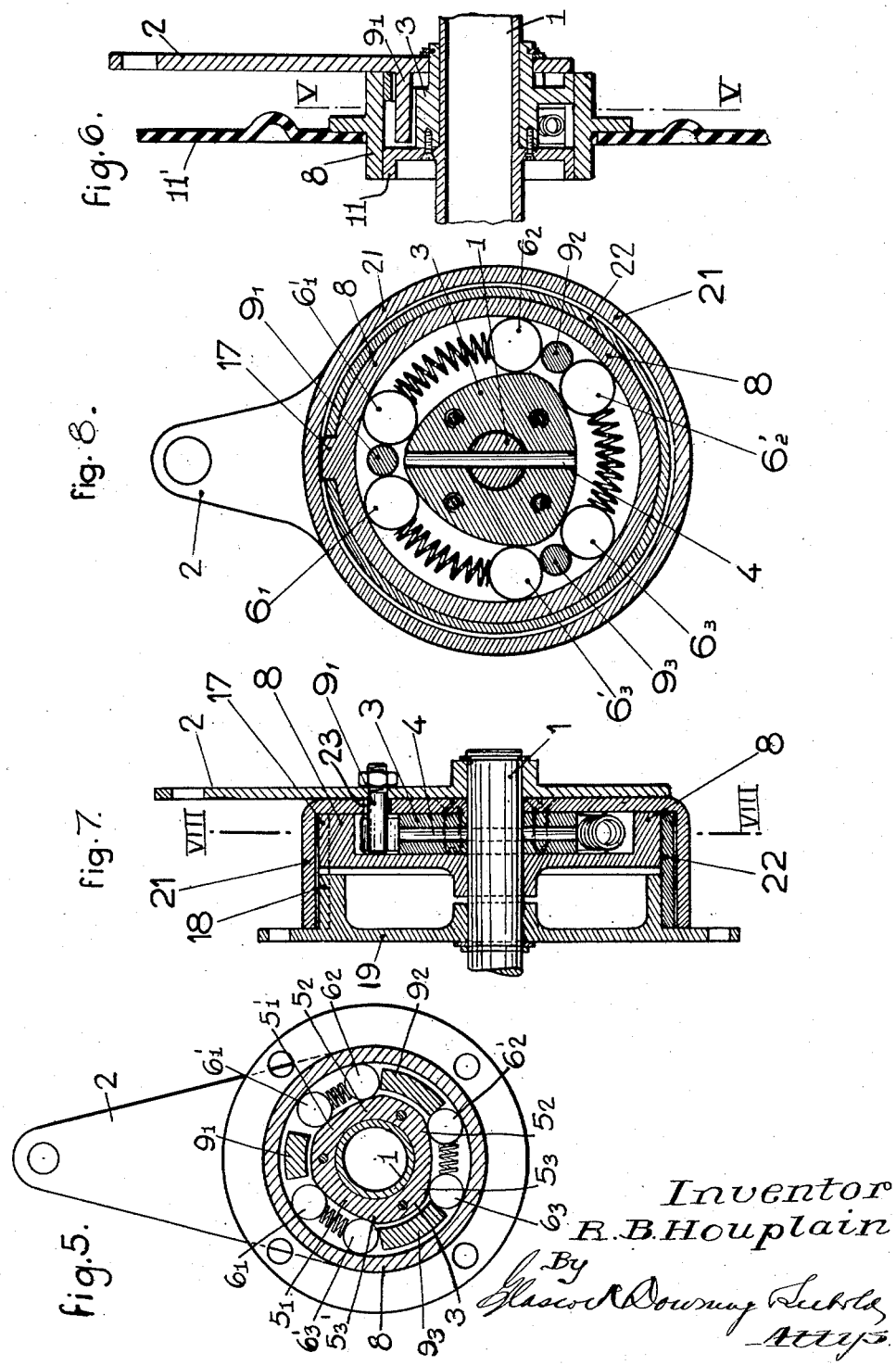
Inventor
R. B. Houplain
By
Mason Downing Liddle
Attys Patented Jan. 22, 1952

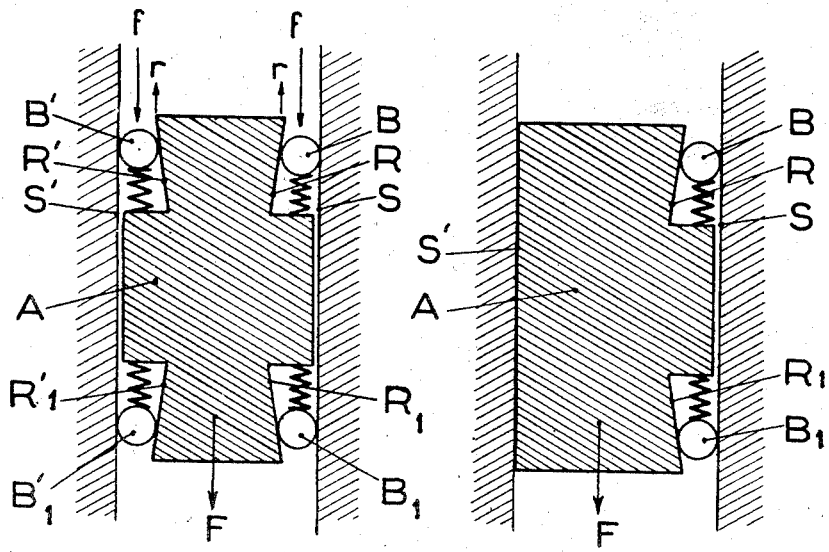
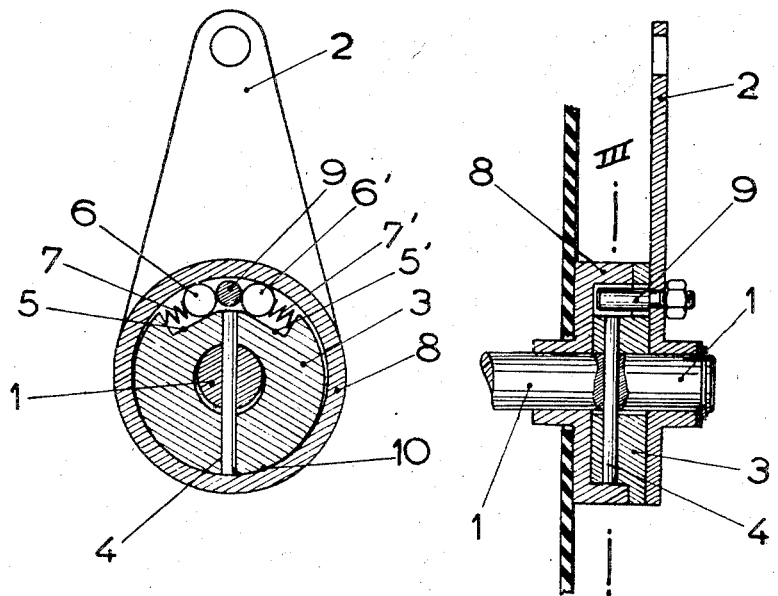

2,583,428

UNITED STATES PATENT OFFICE 2,583,428

IRREVERSIBLE DRIVING DEVICE

René Benjamin Houplain, Paris, France

Application June 4, 1946, Serial No. 674,233
In France May 6, 1946

9 Claims. (Cl. 192—8)

The present invention relates to an irreversible driving device for rotating a driven element and enabling such driven element to be locked in both directions of rotation as soon as the driving force ceases to be applied to the driving member.

The invention applies particularly to the case in which the driven element is subjected to reactions or torque tending to rotate it in the same direction as the driving force when applied, and a driving device according to the invention comprises in combination a wedging mechanism provided with a pair or pairs of rolling contact wedging members, such as, balls or rollers which are adapted to be wedged between an external drum and a pair or a plurality of pairs of opposed slopes on a cam secured for rotation with the driven element, unwedging means acting on said balls or rollers and applying the drive to the driven element after release thereof from the wedging action of said balls or rollers, and braking means automatically providing a frictional braking action for said driven element when it tends to overrun its drive, said frictional braking action being induced by at least one of said balls or rollers moving towards its wedging position and thereby causing frictional engagement of the cam or a member rigidly connected to the cam with said external drum or with means held against rotation in relation to said drum, which frictional braking action increases progressively during wedging and diminishes progressively during unwedging.

In known arrangements in which a driven shaft is subjected to strong reactions acting in the direction of the drive, the working of wedging balls or rollers alone is not satisfactory. In fact the reactions produce a wedging of the mechanism which on the one hand necessitates a very strong unwedging force that may be too great for manual operation, and which on the other hand produces a jolting and shuddering movement due to the reaction tending to re-wedge the mechanism as soon as the driving power has unwedged it and has effected a slight rotation of the driven shaft. It has already been proposed to remedy this disadvantage by interposing between the operating device and the unwedging fingers a lever or other means providing mechanical advantage but difficulties in the application of such a drive are experienced.

In other known arrangements of the irreversible drive comprising a segment brake automatically released on the application of the driving power and automatically tightened on cessation thereof, the operation can easily be effected whatever the direction of the reactions exerting themselves on the driven shaft, but their working depends on the state of the surfaces in contact and their efficiency can therefore vary considerably and they do not present a sufficient working security under a predetermined load.

The irreversible driving device according to the present invention combines these two known irreversible drive principles and enables the above mentioned defects to be substantially avoided.

In such a combination, while an instantaneous and positive locking of the driven shaft is effected by the ball or roller wedging means as soon as the power applied to said shaft, stops practically all the forces, independent from said power, acting on said driven shaft, and particularly all the forces tending to move said shaft in the direction of its drive are absorbed by the brake, thereby facilitating the unwedging of the balls or rollers of the wedging means.

Other objects and advantages of the present invention will become apparent from the reading of the following description, in which three embodiments are given as examples of the invention and are described in reference to the accompanying drawings, in which:

Figures 1 and 2 are schematic illustrating the principle of the invention with Figure 1 representing known arrangements.

Figures 3 and 4 illustrate diagrammatically, respectively in transverse and axial section an embodiment of the invention in which the brake shoe drive device is constituted by a part of the wedging cam.

Figures 5 and 6 are views corresponding to Figures 3 and 4 of an improved form of the embodiment of Figures 3 and 4; and Figures 7 and 8 illustrate respectively an axial section and a transverse section along lines VIII—VIII of Figure 7, another embodiment of the invention.

The principle of the known self-locking mechanisms utilizing merely wedging means is illustrated schematically in Fig. 1, in which a driven member A is mounted to move freely between two parallel surfaces S, S', against which it can be wedged by the balls B, B' and BI, B'I cooperating with inclined slopes or ramps R, R' and RI, R'I, respectively. For example, if the driven member A must be moved vertically downwards, and if, besides being submitted to a driving or controlling power, it is simultaneously subjected to a force F acting in the same direction (which is the case in numerous applications, particularly in the field of aviation, for example in the mechanism controlling the height or level of the seat of the pilot, and in that of retractable landing gears, one sees that this force F provokes the wedging of the upper pair of balls B, B' by creating a reaction, the vertical components $r$ of which add themselves to the action of the springs of these upper balls B, B' to overcome the unwedging forces $f$ which act in opposite direction on said balls B, B'. Since the wedging multiplies the force F about 10 times, it is therefore evident that the unwedging can not be effected without the expenditure of considerable force or effort. If, on the contrary, (Fig. 2), the driven member A is wedged but by a single ball B or $B_1$ against movement in each direction, this ball working between the slopes or ramps R or $R_1$ and a single reaction surface S, this wedging also having the effect of pressing the driven member A against the second surface S' and the nature of these contacting surfaces is so selected as to present an adequate coefficient of friction, thus it follows, that at the moment of unwedging, when driven member A tends to move under the action of the driving power, the force F will be substantially absorbed by the friction between the surfaces A and S' and will not disturb, or will disturb very little the unwedging which consequently will not require more than a moderate effort or unwedging force. Likewise, it will be possible to obtain a continuous displacement, without jerks, of the driven member A, the rewedging by the force F being damped by the friction.

In the first embodiment illustrated in Figs. 3 and 4, the self-locking mechanism is intended to lock a driven shaft 1, in either direction and which shaft is rotated by means of a control lever 2, and comprises a cam 3, secured to the shaft 1 by a pin 4, and presenting two opposed slopes or ramps 5, 5' cooperating with balls or rollers 6, 6', wedging themselves between these ramps 5, 5' and an outer fixed drum 8 under the action of springs 7, 7' so as to lock the shaft 1 in either direction. The release and driving of the shaft 1 are effected successively by operating the lever 2, which is mounted freely on the shaft 1 and carries a stud 9 projecting between the two balls 6, 6', so as to push away from its active position one or the other of them according to the direction of motion of the lever 2. As soon as the release or unwedging of the shaft 1 is thus realized, the angular motion of the lever 2 is thence positively transmitted to the shaft 1 through the intermediary of the stud 9, one of the balls 6, 6', the corresponding compressed spring 7 or 7' and the cam 3. Except for the groove or notch forming the opposed ramps 5, 5', the cam 3 presents a circular periphery substantially in contact with the inner periphery of the drum 8. In order to allow that its circular periphery act as the shoe of a brake, the cam 2 is mounted with a certain radial play on the shaft 1 along the pin 4. In this manner, the wedging of one of the two balls, for example of the ball 6, under the effect of the spring 7 or of an independent force tending to turn the cam 3 counterclockwise or of a combination of these two effects, provokes, owing to a transverse or radial displacement of the cam 3 along the pin 1, a strong application of the lower part of the circular periphery against the inner periphery of the drum 8, on both sides of the point 10 which is diametrically opposed to the center of the wedged ball 6. Thus a braking action is produced which substantially absorbs any force tending to turn the cam counter-clockwise. When the lever is operated counter-clockwise, the finger 9 pushes the ball 6, against the action of the spring 7, the radial pressure effecting the braking at and on both sides of the point 10 decreases and the cam 3 can slide to drive the shaft 1 but it stops instantaneously as soon as one ceases to operate the lever 2.

Figs. 5 and 6 show a modification of this first embodiment in which the cam 3 is keyed to the shaft 1 and presents, in order to insure a more complete and uniform locking of the shaft, three pairs of opposed slopes or ramps $5_1$, $5'_1$; $5_2$, $5'_2$; and $5_3$, $5'_3$ cooperating with three corresponding pairs of rollers $6_1$, $6'_1$; $6_2$, $6'_2$; and $6_3$, $6'_3$. The lever 2 carries three arcuate unwedging fingers or studs $9_1$, $9_2$, $9_3$ the first of which is of smaller arcuate extent than the others so as to be the last to act and thus maintain some braking action during the unwedging of the rollers $6_2$ and $6_3$ or $6'_2$ and $6'_3$. This braking action is effected between a circular flange or brake shoe 11, secured to the cam 3 and the inner periphery of a drum 8 which is mounted for this purpose on the support or frame of the apparatus, not shown, through the intermediary of a flexible support 11' with a certain plasticity in a radial direction or the transverse sense with respect to the shaft 1, this elasticity being in substitution for the transverse or radial play of the cam 3 of the device shown in Figs. 2 and 3.

In the form of the invention illustrated in Figs. 7 and 8, the reaction drum 8 of the self-locking mechanism or drive is mounted freely on the shaft 1 and presents tangentially an outwardly projecting key 17, aligned with an identical key 18 tangentially formed on a fixed drum 19. These two drums 8 and 19 are housed in the interior of a cylindrical or a cup-shaped member 21, secured to the cam 3, and a spring 22 in the form of a split ring, having the width of the two drums 8, 19, is interposed between these two drums and the cup-shaped member 21; this spring tending constantly to maintain between its extremities the key 17 of the movable drum 8 aligned with the key 18 of the fixed drum 19. The cam 3 is secured to the shaft 1 by the radial pin 4. Any reaction exerted on the shaft 1 tends to rotate the cam 3 and the drum 8 which is secured to the former by the wedging of balls or rollers $6'_1$, $6'_2$, $6'_3$ or $6_1$, $6_3$, $6_2$. The key 17 of this drum 8 deforms the spring 22 which acts as a brake-shoe and exerts a braking action on the cup-shaped member 21. When the control lever 2 is operated, the balls or rollers are unwedged by the action of the studs $9_1$, $9_2$, $9_3$, which project through slots 23 in the base of the member 21, only one of which is indicated in Figure 7, and the drum 8 is thereby released. The spring 22 brings then the two keys 17, 18 back into alignment and simultaneously releases its radial pressure or braking action on the cup-shaped member 21, so that the shaft 1 becomes free to be positively driven or controlled by the lever 2.

As soon as the motive force acting on the lever 2 ceases to be applied reaction on the shaft 1 causes the wedging of either the balls or rollers $6'_1$, $6'_2$, $6'_3$ of $6_1$, $6_3$, $6_2$, and reestablishes the braking action by deformation of the spring 22.

What I claim is:

1. An irreversible driving device for rotating a driven element and locking the element from movement in either direction as soon as driving power ceases comprising, a driven element, a cam secured for rotation with said element and having at least one pair of oppositely inclined slopes thereon, a substantially fixed annular member surrounding said cam and concentric with the axis thereof, the inner periphery of said annular member constituting a substantially stationary reaction surface, rolling contact wedging members interposed between the cam slopes and the said reaction surface, unwedging means acting on said wedging members and applying power to the driven element after release of the wedging action, a driving member controlling said unwedging means, and braking means including means mounting said cam for transverse movement with respect to said driven element so that upon movement of at least one of said wedging members toward its wedging position said cam will move transversely of said driven element so that a portion thereof will frictionally engage with the reaction surface at an area opposite said wedging member so as to provide a frictional braking action which increases progressively during wedging and diminishes progressively during unwedging.

2. An irreversible driving device for rotating a driven shaft and locking the shaft from movement in either direction as soon as driving power ceases comprising, a driven shaft, a cam spacedly surrounding said shaft and having a pair of oppositely inclined slopes thereon, spaced shoulders on said cam defining the limits of the slopes a fixed drum concentrically surrounding said cam, the inner periphery of said drum constituting a stationary reaction surface, rolling contact wedging members interposed between said cam slopes and said reaction surface, resilient means interposed between said wedging members and said shoulders and normally urging the wedging members toward locking position, a driving lever rotatably mounted on said driven shaft, an unwedging member carried by said lever and acting on said wedging members to release the same, and a pin traversing said driven shaft and said cam to secure the same with transverse play for rotation with said shaft whereby movement of one of said wedging members towards wedging position will cause transverse displacement of said cam along said pin and its frictional engagement with said reaction surface at a point diametrically opposite said moving wedging member.

3. A drive device for rotating a shaft in two directions and locking the same against movement in either direction upon cessation of driving power comprising, a shaft rotatable in two directions, a cam secured to the shaft and having a plurality of pairs of opposed slopes thereon, an outer drum concentric of the cam, means supporting said drum for yielding movement in a plane perpendicular to the shaft and the axis of the cam, rolling contact wedging means interposed between the slopes on the cam and the inner periphery of the drum and operable to lock the shaft against rotation, a brake shoe secured to the cam and cooperable with the inner periphery of said outer drum to automatically provide a braking action for said shaft that increases progressively during wedging and diminishes progressively during unwedging and unwedging means through which power is applied to said shaft after release of the shaft from the locking action and the braking action.

4. A drive device as defined in and by claim 3 in which the cam is provided with three pairs of opposed slopes, and three pairs of rolling contact wedging members cooperate therewith, said outer drum having greater axial extent than the cam, and the brake shoe comprising a drum fixed to the cam, the outer periphery of said second drum frictionally engaging the inner periphery of said outer drum and the unwedging means including a lever rotatably mounted on said shaft and having three arcuately spaced arcuate fingers projecting between the pairs of rolling contact members.

5. A drive device as defined in and by claim 4 in which one of said arcuate fingers is of less arcuate extent than the other two so as to be the last to act on the rolling contact wedging members adjacent thereto so as to maintain some braking action during unwedging of the members of the other two pairs of rolling contact wedging members.

6. An irreversible drive for rotating a shaft in two directions and locking the same against movement in either direction upon cessation of driving power comprising a shaft rotatable in two directions, a cam secured to the shaft and having a plurality of pairs of opposed slopes thereon, a first drum concentrically surrounding the cam and free to rotate on said shaft, a plurality of rolling contact wedging members interposed between the slopes on the cam and the inner periphery of said drum, said drum having a key member projecting outwardly of the exterior thereof and extending axially of the shaft, a second drum having the same diameter as the first, disposed adjacent and coaxial with the first drum and fixed relative thereto and also having a key member similar to the first mentioned key member projecting outwardly of the exterior thereof, an annular member secured for rotation with the cam and spacedly surrounding said drums, a split ring constituting a brake shoe interposed between the outer periphery of the drums and the inner periphery of the annular member, the opposite ends of the split ring being disposed on opposite sides of the respective key members and normally maintaining the key members in axial alignment, and upon movement of the shaft in either direction said key member in the first drum deforming the shoe against the annular member to provide a friction braking action that increases progressively with the wedging of the rolling contact members, and unwedging means for releasing the shaft from the locking action of the wedging members and the braking action and for applying power to said shaft.

7. A drive device as defined in and by claim 6 in which the annular member includes a portion extending inwardly toward the axis of the shaft so as to define a cup-shaped body, said body being secured to the cam and said unwedging means including a lever freely mounted on said shaft exteriorly of said cup-shaped body, said portion of said annular member extending toward said shaft having slots therein and said lever having studs projecting therefrom, through said slots and extending between and cooperable with the rolling contact wedging members that are respectively cooperable with the slopes on the cam so that the studs can exert force on said wedging members to unwedge the same to release the movable drum so that the split ring can restore the keys to their aligned position and simultaneously release its braking action exerted on the inner periphery of the cup-shaped body to release the shaft.

8. An irreversible drive device for rotating a shaft in two directions and locking the same against movement in either direction upon cessation of driving power comprising a shaft rotatable in two directions, a cam member secured to the shaft and having at least a pair of opposed slopes thereon, at least one drum member concentrically surrounding the cam rolling contact wedging elements wedgable between the cam member and the drum member, a brake shoe surface movable with said cam member, at least one of said members being mounted for transverse movement relative to the axis of such shaft so as to automatically provide a braking action for such shaft that increases progressively during wedging and diminishes progressively during unwedging and unwedging means through which power is applied to such shaft after releasing the shaft from the locking action of the wedging means and from the braking action.

9. An irreversible drive device for rotating a shaft in two directions and locking the same against movement in either direction upon cessation of driving power comprising a shaft rotatable in two directions, a cam member secured to the shaft and having at least a pair of opposed slopes thereon, at least one annular member concentrically surrounding the cam, rolling contact wedging elements wedgable between the cam member and the annular member, a brake shoe member cooperable with said annular surface, at least one of said members being mounted for transverse movement relative to the axis of such shaft so as to automatically provide a braking action for such shaft that increases progressively during wedging and diminishes progressively during unwedging and unwedging means through which power is applied to such shaft after releasing the shaft from the locking action of the wedging means and from the braking action.

RENÉ BENJAMIN HOUPLAIN.

REFERENCES CITED

The following references are of record in the file of this patent:

UNITED STATES PATENTS

| Number | Name | Date |
|---|---|---|
| 1,385,785 | Hofer et al. | July 26, 1921 |
| 1,774,843 | Petit | Sept. 2, 1930 |
| 1,835,349 | Smith | Dec. 8, 1931 |
| 2,251,466 | Poyson | Aug. 5, 1941 |
| 2,414,341 | Spraragen | Jan. 14, 1947 |

FOREIGN PATENTS

| Number | Country | Date |
|---|---|---|
| 70,536 | Switzerland | Mar. 20, 1915 |
| 352,186 | Italy | Sept. 8, 1937 |
| 369,960 | France | Jan. 25, 1907 |
| 508,123 | Germany | Sept. 24, 1930 |